(12) United States Patent  
Narasimhan et al.

(10) Patent No.: US 8,416,759 B1  
(45) Date of Patent: Apr. 9, 2013

(54) CARRIER FREQUENCY OFFSET AND DOPPLER FREQUENCY ESTIMATION AND CORRECTION FOR OFDMA AND SC-FDMA

(75) Inventors: Ravi Narasimhan, Los Altos, CA (US); Shi Cheng, Sunnyvale, CA (US)

(73) Assignee: Applied Micro Circuits Corporations, Sunnyvale, CA (US)

( * ) Notice: Subject to any disclaimer, the term of this patent is extended or adjusted under 35 U.S.C. 154(b) by 319 days.

(21) Appl. No.: 12/848,043

(22) Filed: Jul. 30, 2010

(51) Int. Cl.
*H04B 7/208* (2006.01)

(52) U.S. Cl.
USPC .......................... 370/344; 375/260; 375/344

(58) Field of Classification Search .................. 370/344; 375/141, 232, 260, 267
See application file for complete search history.

(56) References Cited

U.S. PATENT DOCUMENTS

| | | | | |
|---|---|---|---|---|
| 2006/0159188 | A1* | 7/2006 | Izumi ............................ | 375/260 |
| 2007/0268976 | A1* | 11/2007 | Brink et al. ................... | 375/260 |
| 2008/0101496 | A1* | 5/2008 | Gaikwad ....................... | 375/267 |
| 2008/0317149 | A1* | 12/2008 | Sondur et al. ................. | 375/260 |
| 2010/0111157 | A1* | 5/2010 | Sawai ............................ | 375/232 |
| 2012/0155512 | A1* | 6/2012 | Giannakis et al. ............ | 375/141 |

OTHER PUBLICATIONS

J. Li, G. Liu and G. B. Giannakis, "Carrier frequency offset estimation for OFDM-based WLANs," IEEE Signal Proc. Letters, vol. 8, No. 3, pp. 80-82, Mar. 2001.

T. M. Schmidl and D. C. Cox, "Robust frequency and timing synchronization for OFDM," IEEE Trans. Commun., vol. 45, No. 12, pp. 1613-1621, Dec. 1997.

H. Zhou, A. V. Malipatil and Y.-F. Huang, "Maximum-likelihood carrier frequency offset estimation for OFDM systems in fading channels," in Proc. IEEE WCNC 2006.

P. H. Moose, "A technique for orthogonal frequency division multiplexing frequency offset correction," IEEE Trans. Commun., vol. 42, No. 10, pp. 2908-2914, Oct. 1994.

Lakshmish R., "Hard decision parallel interference cancellation for uplink OFDMA," in Proc. IEEE Intl. Symp. on Circuits and Systems, 2006.

* cited by examiner

*Primary Examiner* — Albert T Chou
(74) *Attorney, Agent, or Firm* — Turocy & Watson, LLP (57) ABSTRACT

A system and method are provided for carrier frequency offset (CFO) and Doppler frequency estimation and correction for Orthogonal Frequency-Division Multiple Access (OFDMA) and Single Carrier-Frequency-Division Multiple Access (SC-FDMA) signals in a wireless communications receiver. The receiver is capable of accepting a plurality of multicarrier signals transmitted simultaneously from a plurality of transmitters, with overlapping carrier frequencies and orthogonal reference signals. For each multicarrier signal, a channel estimate is performed and the channel is equalized. Then, a frequency offset is estimated between the transmit carrier frequency of each multicarrier signal and a receiver local oscillator frequency using either the phase rotation of data constellations as a function of time or the phase rotation of channel estimates as a function of time. The receiver supplies the CFO/Doppler frequency estimates and corrects the equalized symbols prior to demodulation.

22 Claims, 5 Drawing Sheets

Fig. 7

CARRIER FREQUENCY OFFSET AND DOPPLER FREQUENCY ESTIMATION AND CORRECTION FOR OFDMA AND SC-FDMA

BACKGROUND OF THE INVENTION

1. Field of the Invention

This invention generally relates to Orthogonal Frequency Division Multiple Access (OFDMA) and Single Carrier Frequency Division Multiple Access (SC-FDMA) communications, and more particularly, to system and method for estimating carrier frequency offset (CFO) and Doppler frequency shifts.

2. Description of the Related Art

Figure 1:
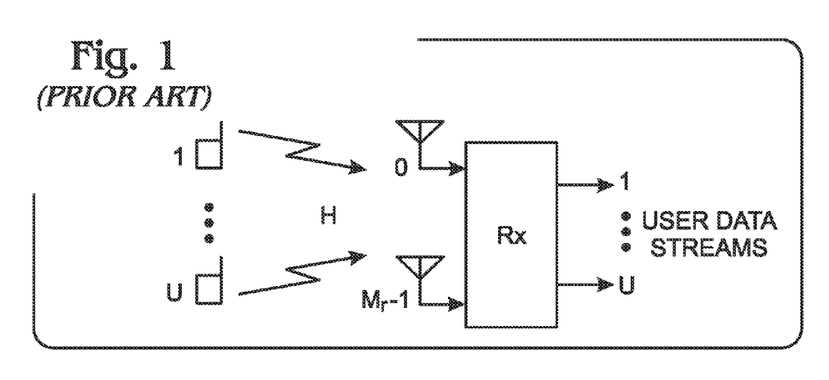
FIG. 1 is a diagram depicting a Multiuser MIMO (MU-MIMO) wireless communication system (prior art).

FIG. 1 is a diagram depicting a Multiuser MIMO (MU-MIMO) wireless communication system (prior art). Multiple users can transmit data simultaneously at the same frequency to a multi-antenna base station, resulting in increased aggregate cell throughput. There is a need to decouple data streams from different users via MU-MIMO equalization, which requires MU-MIMO channel estimation.

Figure 2:
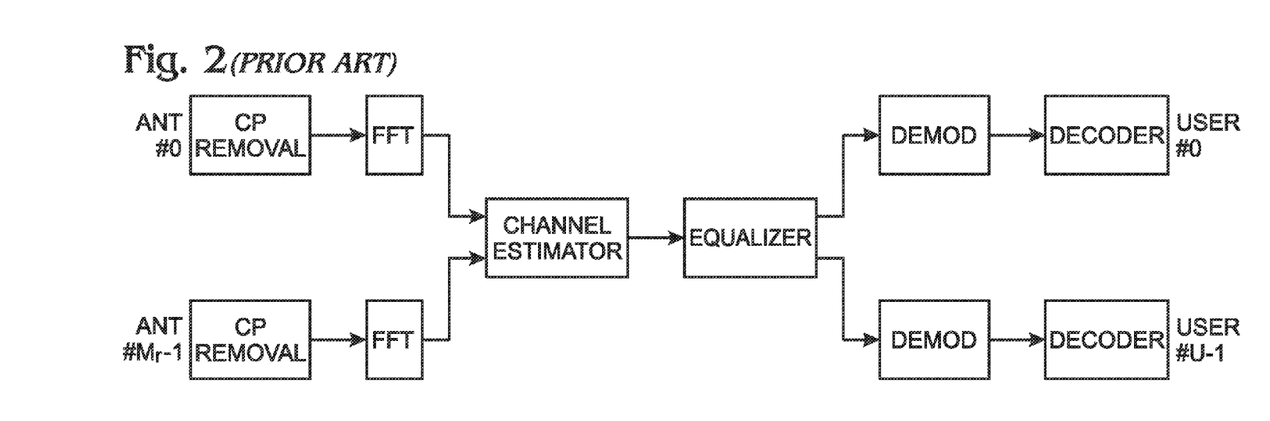
FIG. 2 is a diagram depicting an exemplary MIMO receiver (prior art).

FIG. 2 is a diagram depicting an exemplary MIMO receiver (prior art). Channel estimation is needed in multi-user and single-user MIMO receivers to separate different spatial streams and/or user signals via equalization. Of special interest is OFDMA and SC-FDMA multi-user MIMO channel estimation with a single spatial stream per user (e.g., LTE uplink). After cyclic pulse (CP) removal and a fast Fourier transform (FFT), the input to the channel estimator block is the received frequency domain signal of reference symbols from Mr number of receive antennas. The outputs are channel responses in the frequency domain from user u ($1 \leq u \leq U$) to antenna m ($0 \leq m \leq Mr-1$) are demodulated (demod) and decoded.

In SC-FDMA or OFDMA, carrier frequency offset (CFO) and Doppler frequency estimation and correction mitigate against the loss of orthogonality among subcarriers and users. Each user has a different CFO/Doppler frequency shift. Hence, CFO/Doppler estimation and correction should be done in the frequency domain on a per-user basis after user separation (which is performed by the equalizer).

Conventional methods of CFO compensation in OFDM include time-domain tracking loops, which are not feasible for OFDMA or SC-FDMA systems because each user has a different CFO. Other methods for OFDMA typically assume a certain frequency allocation for the user.

Figure 3:
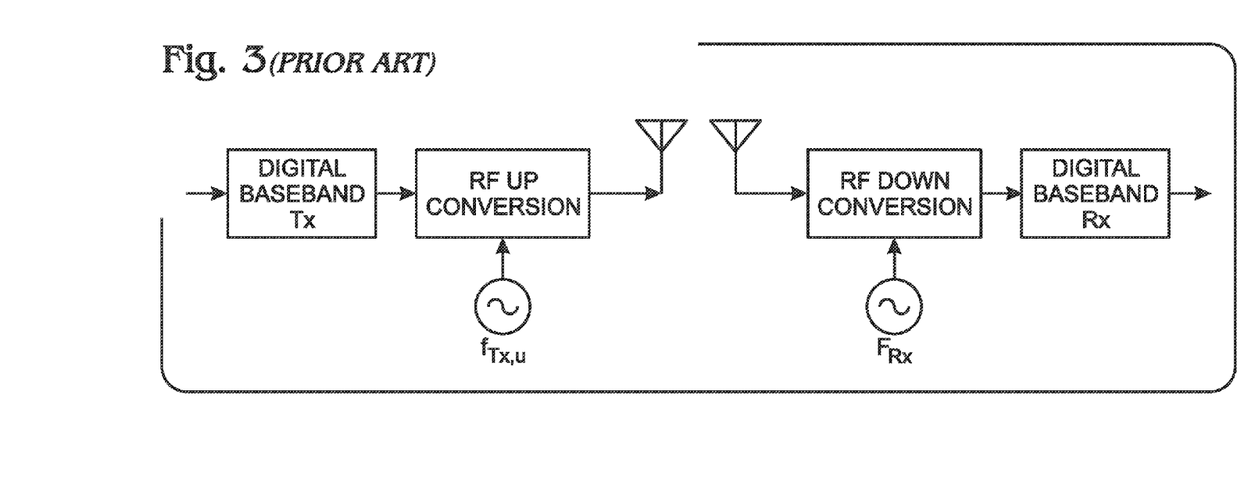
FIG. 3 is a diagram illustrating the source of CFO and Doppler frequency shift (prior art).

FIG. 3 is a diagram illustrating the source of CFO and Doppler frequency shift (prior art). CFO and Doppler frequency shift cause a linear phase rotation in time of the received signal. The combined CFO and Doppler frequency shift for user u is denoted by $\Delta f_u$, where $$\Delta f_u = f_{Rx} - f_{Tx,u}$$

The phase rotation causes constellations to rotate and results in higher block error rates.

The CFO/Doppler frequency shift can be modeled. The equivalent baseband signal model is as follows:

$$y(t) = e^{-j2\pi f_{Rx} t} \sum_u \int h_u(t, \tau) e^{j2\pi f_{Tx,u}(t-\tau)} x_u(t-\tau) d\tau + w(t)$$

$$= \sum_u e^{-j2\pi \Delta f_u t} \int h_u(t, \tau) e^{-j2\pi f_{Tx,u}\tau} x_u(t-\tau) d\tau + w(t)$$

-continued
$$= \sum_u e^{-j2\pi \Delta f_u t} \int \tilde{h}_u(t, \tau) x_u(t-\tau) d\tau + w(t)$$

$y(t)$: received signal vector $x_u(t)$: transmitted signal for user $u$ $h_u(t, \tau)$: time – varying channel impulse response for user $u$ $w(t)$: AWGN vector Assuming the phase of the channel response is linear over time t, and the amplitude remains constant, the phase change from the channel can be absorbed into $\Delta f_u$.

Figure 4:
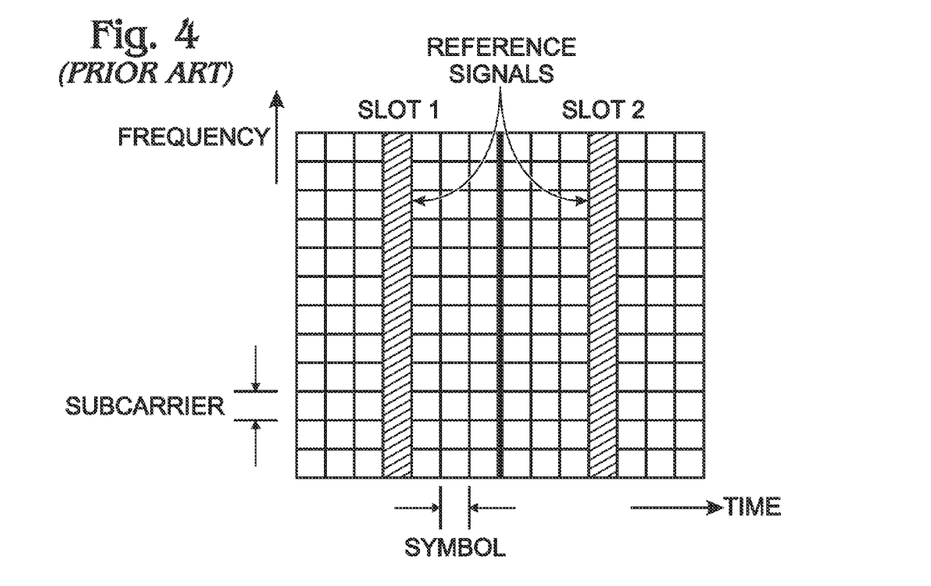
FIG. 4 is a diagram depicting a subframe consisting of two slots, as is used in Long Term Evolution (LTE) (prior art).

FIG. 4 is a diagram depicting a subframe consisting of two slots, as is used in Long Term Evolution (LTE) (prior art). LTE is the Third Generation Partnership Program (3GPP) term for the next generation cellular standard. The figure shows two resource blocks, with one resource block per slot. Each slot includes seven OFDMA or SC-FDMA symbols for normal CP, or 6 symbols for extended CP, at twelve subcarrier frequencies. In OFDMA and SC-FDMA, each user is allocated resource elements (REs) in time and frequency. SC-FDMA is similar to OFDMA except that user data are spread via a discrete Fourier transform (DFT) before OFDMA modulation. Each resource element consists of 1 subcarrier in the frequency domain and 1 OFDMA or SC-FDMA symbol in the time domain. User data modulates the amplitude and phase of each subcarrier for the duration of 1 OFDMA or SC-FDMA symbol. Multiple users can modulate the same RE (MU-MIMO). In the LTE uplink, each user transmits reference signals on all REs of specified symbols. Different user reference signals are multiplexed using different cyclic shifts. The base station uses the reference signals to estimate a channel for each user.

Figure 5:
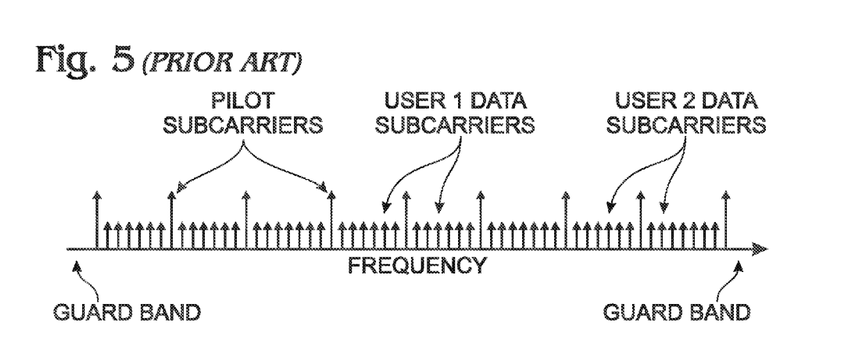
FIG. 5 is a diagram depicting an exemplary OFDMA frequency spectrum (prior art).

FIG. 5 is a diagram depicting an exemplary OFDMA frequency spectrum (prior art). OFDMA is a multi-user version of the popular Orthogonal frequency-division multiplexing (OFDM) digital modulation scheme. Multiple access is achieved in OFDMA by assigning subsets of subcarriers to individual users as shown. This allows simultaneous low data rate transmission from several users. OFDMA is recognized as being highly sensitive to frequency offsets and phase noise. OFDMA can also be described as a combination of frequency domain and time domain multiple access, where the resources are partitioned in the time-frequency space, and slots are assigned along the OFDM symbol index as well as OFDM sub-carrier index. OFDMA is considered as highly suitable for broadband wireless networks, due to advantages including scalability and MIMO-friendliness, and ability to take advantage of channel frequency selectivity.

SC-FDMA is a multi-user version of Single-carrier frequency-domain-equalization (SC-FDE) modulation scheme. SC-FDE can be viewed as a linearly precoded OFDM scheme, and SC-FDMA can be viewed as a linearly precoded OFDMA scheme, henceforth LP-OFDMA. FDE is the equalizer at receiver end. It is different from the modulation scheme. Or, it can be viewed as a single carrier multiple access scheme. Just like in OFDM, guard intervals with cyclic repetition are introduced between blocks of symbols in view to efficiently eliminate time spreading (caused by multi-path propagation) among the blocks. In OFDM, a Fast Fourier transform (FFT) is applied on the receiver side on each block of symbols, and inverse FFT (IFFT) on the transmitter side. In SC-FDE, both FFT and IFFT are applied on the receiver side, but not on the transmitter side. In SC-FDMA, both FFT and IFFT are applied on the transmitter side, and also on the receiver side.

In OFDM as well as SC-FDE and SC-FDMA, equalization is achieved on the receiver side after the FFT calculation, by multiplying each Fourier coefficient by a complex number. Thus, frequency-selective fading and phase distortion can be combated. The advantage is that FFT and frequency domain equalization requires less computation power than conventional time-domain equalization. In SC-FDMA, multiple access is made possible by inserting zero Fourier-coefficients on the transmitter side before the IFFT, and removing them on the receiver side after the FFT. Different users are assigned to different Fourier-coefficients (sub-carriers).

LTE uses OFDMA for the downlink—that is, from the base station to the terminal. In the time domain the radio frame is 10 ms long and consists of 10 sub frames of 1 ms each. In LTE with frequency-division duplexing (FDD), every sub frame consists of 2 slots where each slot is 0.5 ms. The subcarrier spacing in the frequency domain is 15 kHz and there are modes with 7.5 kHz subcarrier spacing. Twelve of these subcarriers together (per slot) are called a resource block, so one resource block is 180 kHz. 6 Resource blocks fit in a carrier of 1.4 MHz and 100 resource blocks fit in a carrier of 20 MHz. In the uplink, for the Physical Uplink Shared channel (PUSCH) only, LTE uses a pre-coded version of OFDMA called SC-FDMA to compensate for a drawback with normal OFDMA, which has a very high peak-to-average power ratio (PAPR). High PAPR requires expensive and inefficient power amplifiers with high requirements on linearity, which increases the cost of the terminal and drains the battery faster. SC-FDMA solves this problem by grouping together the resource blocks in a way that reduces the need for linearity, and so power consumption, in the power amplifier. A low PAPR also improves coverage and the cell-edge performance.

In MIMO systems, a transmitter sends multiple streams by multiple transmit antennas. The transmit streams go through a matrix channel which consists of all paths between the transmit antennas at the transmitter and receive antennas at the receiver. Then, the receiver gets the received signal vectors by the multiple receive antennas and decodes the received signal vectors into the original information. A narrowband flat fading MIMO system is modeled as:

$$y=Hx+n$$

where y and x are the receive and transmit vectors, respectively, and H and n are the channel matrix and the noise vector, respectively. Where x is a Mt×1 vector, y and n are Mr×1 vectors.

With respect to MU-MIMO channel estimation for OFDMA/SC-FDMA, user reference signals with different cyclic shifts are orthogonal across a number of tones in ideal scenarios (no timing offset and low delay spread). In this case, channel estimation for each user is decoupled. Several channel estimation techniques exist in prior art, such as least squares, minimum mean-square error (MMSE), discrete cosine transform (DCT), can be used under the orthogonality assumption. In practice, orthogonality is destroyed because of different user timing offsets and/or medium to high delay spreads.

Figure 6:
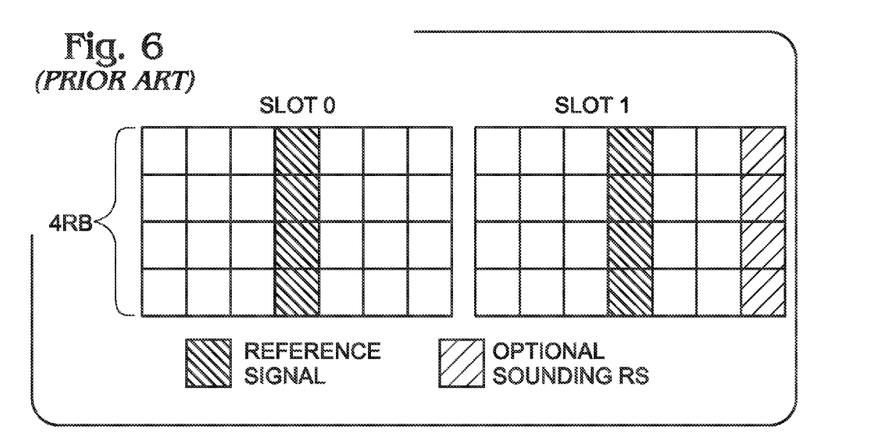
FIG. 6 is a drawing depicting uplink reference signals in LTE (normal cyclic prefix) (prior art).

FIG. 6 is a drawing depicting uplink reference signals in LTE (normal cyclic prefix) (prior art). The reference signals of the different users are orthogonal across a number of tones if the same base sequence is used and each user applies a unique cyclic shift. The demodulation reference signal (DM-RS) for each slot is assigned SC-FDMA symbol index 0. The DM-RS symbol is the phase reference since the equalizer is computed at the DM-RS symbol. Thus, degradation from phase rotation is worse for constellations in symbols further in time from the DM-RS symbol. The duration of each SC-FDMA symbol is Tsym. The duration of each slot is Tslot.

It would be advantageous if the effects of CFO and Doppler frequency shifting could be estimated in a receiver prior to demodulation and decoding.

SUMMARY OF THE INVENTION

Disclosed herein are several related techniques that are used to estimate and correct for carrier frequency offset (CFO) and Doppler frequency shift in OFDMA and SC-FDMA systems. CFO/Doppler frequency estimates are provided and corrections for the resulting constellation rotation can be made prior to the demodulator in a Long Term Evolution (LTE) eNodeB receiver, such that lower block error rates and higher throughputs are achieved in the uplink. The disclosed systems can be used in an eNodeB for both LTE Release 8 (current LTE) and the future LTE advanced standard (e.g., LTE Release 10 and beyond). The disclosed systems can also be used in base stations or access points for Wimax (e.g., IEEE 802.16e, 802.16m, etc.) and future WiFi (e.g., IEEE 802.11ac).

The suite of estimation techniques presented in this disclosure addresses a wide range of user allocations. Furthermore, these estimation techniques can be cascaded together to improve performance.

Accordingly, a method is provided for CFO and Doppler frequency estimation and correction for Orthogonal Frequency-Division Multiple Access (OFDMA) and Single Carrier-Frequency-Division Multiple Access (SC-FDMA) signals in a wireless communications receiver. The receiver is capable of accepting a plurality of multicarrier signals transmitted simultaneously from a plurality of transmitters, with overlapping carrier frequencies and orthogonal reference signals. For each multicarrier signal, a channel estimate is performed and the channel is equalized. Then, a frequency offset is estimated between the transmit carrier frequency of each multicarrier signal and a receiver local oscillator frequency using either the phase rotation of data constellations as a function of time or the phase rotation of channel estimates as a function of time. The receiver supplies the CFO/Doppler frequency estimates prior to demodulation.

With respect to the phase rotation of data constellations as a function of time, either a data-aided maximum-likelihood estimation (MLE) or differential estimation process is used. With respect to the phase rotation of channel estimates as a function of time, a frequency-domain demodulation reference signal (DM-RS), time-domain DM-RS, or Fourier kernel estimation process is used.

Additional details of the above-described CFO/Doppler frequency estimation processes, and a wireless communications receiver with a system for CFO and Doppler frequency estimation and correction for OFDMA and SC-FDMA signals, are provided below.

DETAILED DESCRIPTION

Figure 7:
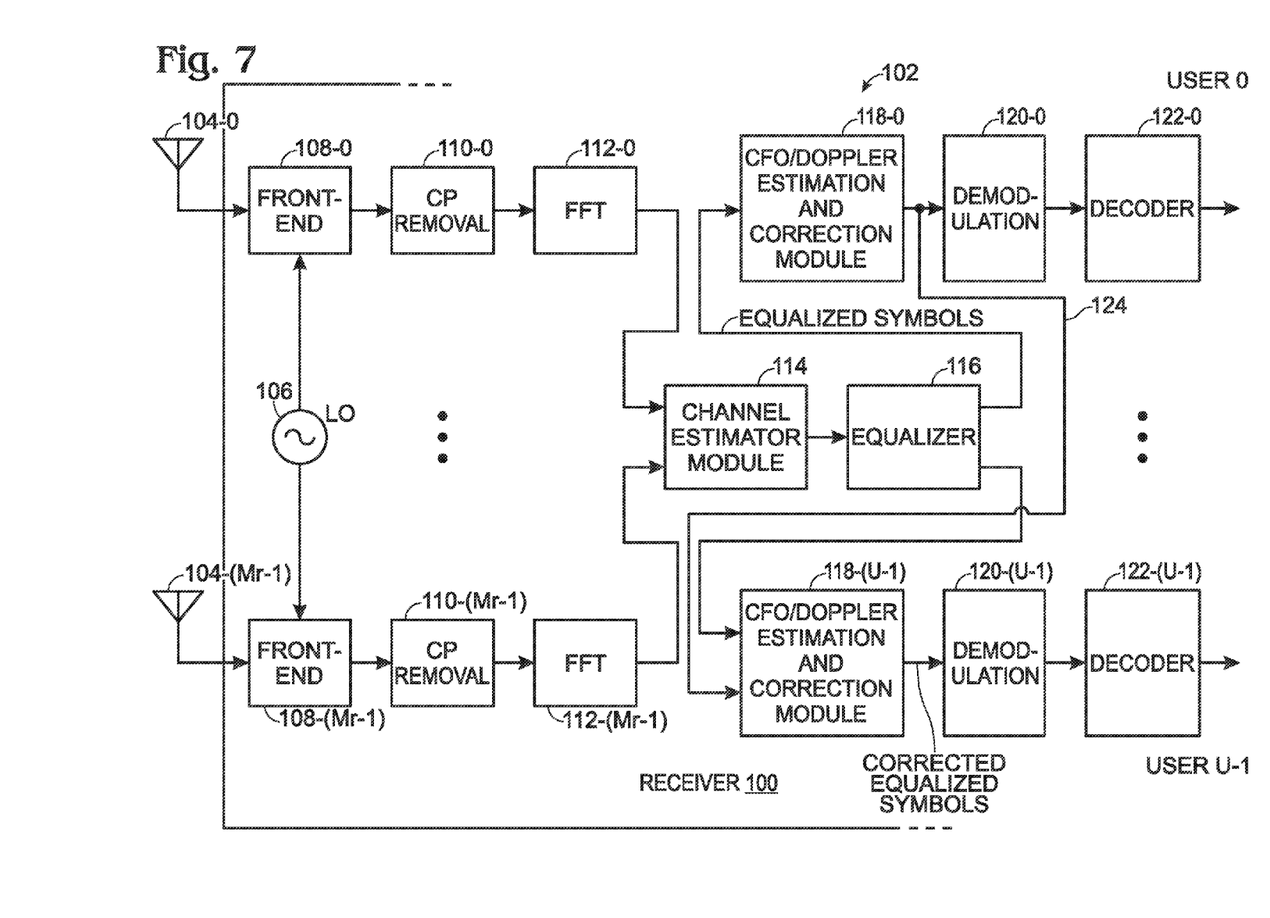
FIG. 7 is a schematic block diagram of a wireless communications receiver with a system for carrier frequency offset (CFO) and Doppler frequency estimation and correction for Orthogonal Frequency-Division Multiple Access (OFDMA) and Single Carrier-Frequency-Division Multiple Access (SC-FDMA) signals.

FIG. 7 is a schematic block diagram of a wireless communications receiver 100 with a system for carrier frequency offset (CFO) and Doppler frequency estimation and correction for Orthogonal Frequency-Division Multiple Access (OFDMA) and Single Carrier-Frequency-Division Multiple Access (SC-FDMA) signals. The system 102 comprises a plurality of receive antennas 104 capable of accepting a plurality of multicarrier signals transmitted simultaneously from a plurality of transmitters (not shown), with overlapping carrier frequencies and orthogonal reference signals. Shown are antennas 104-0 through 104-(Mr−1), where Mr is a variable not limited to any particular value. A local oscillator (LO) 106 supplies a down-conversion frequency to the front-end sections 108, which down-convert the received signals to baseband. Next, the cyclic pulse (CP) is removed in units 110 and a fast Fourier transform performed in units 112.

A channel estimator module 114 has a plurality of inputs (Mr) to accept the plurality of multicarrier signals and an output supplying a channel estimate for each multicarrier signal. An equalizer 116 has an input to accept the channel estimates and a plurality of outputs (U) to supply a plurality of equalized symbols. The functions of the front-end, CP removal, FFT, channel estimation, and equalization are well known in the art, and are therefore not presented in detail. Any of the known methods of performing these functions would enable system 102. The variable U need not necessarily equal the variable Mr.

A plurality (U) of CFO/Doppler estimation and correction modules 118 accept the plurality of equalized channel estimates. Each CFO/Doppler estimation and correction module 118 has an output to supply CFO/Doppler frequency estimates for a frequency offset between the transmit carrier frequency of a corresponding multicarrier signal and the receiver local oscillator 106 frequency. The CFO/Doppler estimation and correction modules use either the phase rotation of data constellations as a function of time or the phase rotation of channel estimates as a function of time.

More explicitly, the phase rotation of data constellations as a function of time uses either a data-aided maximum-likelihood estimation (MLE) or differential estimation process. The phase rotation of channel estimates as a function of time uses a frequency-domain demodulation reference signal (DM-RS), time-domain DM-RS, or Fourier kernel estimation process.

In one aspect, the plurality of receive antennas 104 accept a first multicarrier signal with either intra-subframe or inter-subframe hopping, and a first CFO/Doppler estimation and correction module (e.g., module 118-0) associated with the first multicarrier signal estimates the phase rotation of data constellations as a function of time using the data-aided MLE estimation process. In intra-subframe hopping, a frequency hop occurs at the slot boundary in the middle of a subframe, i.e., different subcarriers are allocated to a user for each slot in a subframe. In inter-subframe hopping the same frequency subcarriers are allocated to a user for both slots in a subframe. If intra-subframe hopping is used and if the frequency allocation is not large enough to use time-domain DM-RS, or if the complexity of the IDFT in time-domain DM-RS is not acceptable, a data-aided MLE process can be used for CFO/Doppler frequency estimation. The data-aided MLE process is as follows:

letting N denote the number of subcarriers allocated to a user;

letting $z_{u,l}^{(s)}$ denote a N×1 vector of received equalized symbols for user u, symbol l (l=−$L_1$, . . . , $L_2$) and slot s (s=0,1);

letting $\hat{x}_{u,l}^{(s)}$ denote a N×1 vector of slicer outputs (hard decisions) for user u, symbol l (l=−$L_1$, . . . , $L_2$) and slot s (s=0,1), assuming hard decisions are perfect;

for l=0 (DM-RS symbol) and s=0,1, $\hat{x}_{u,l}^{(s)} = z_{u,l}^{(s)} = [1 \ldots 1]^T$, finding the MLE for $\Delta f_u$ as follows:

$$\Delta \hat{f}_u = \frac{1}{2\pi T_{sym}} \underset{\Delta f_u}{\operatorname{argmin}} \sum_{s=0}^{1} \sum_{l=-L_1}^{L_2} \|z_{u,l}^{(s)} - e^{j2\pi l \Delta f_u T_{sym}} \hat{x}_{u,l}^{(s)}\|^2$$

using a small angle approximation, such that $$|2\pi \max(L_1, L_2)\Delta f_u T_{sym}| \ll 1 \text{ and,}$$

solving for $$\Delta \hat{f}_u = \frac{1}{2\pi T_{sym}} \frac{\sum_{s=0}^{1} \sum_{l=-L_1}^{L_2} / \operatorname{Im}\left[(\hat{x}_{u,l}^{(s)})^H z_{u,l}^{(s)}\right]}{\sum_{s=0}^{1} \sum_{l=-L_1}^{L_2} /^2 \operatorname{Re}\left[(\hat{x}_{u,l}^{(s)})^H z_{u,l}^{(s)}\right]}$$

In another aspect, a particular CFO/Doppler estimation and correction module 118 may estimate the phase rotation of data constellations as a function of time includes using the differential estimate process. This technique is useful if the small angle approximation used in the data-aided MLE process is not satisfied. The differential estimate process is as follows:

letting N denote the number of subcarriers allocated to a user;

letting $z_{u,l}^{(s)}$ denote a N×1 vector of received equalized symbols (slicer inputs) for user u, symbol l (l=−$L_1$, . . . , $L_2$) and slot s (s=0,1);

letting $\hat{x}_{u,l}^{(s)}$ denote a N×1 vector of slicer outputs (hard decisions) for user u, symbol l (l=−$L_1$, . . . , $L_2$) and slot s (s=0,1), assuming hard decisions are perfect; and, for l=0 (DM-RS symbol) and s=0,1, $\hat{x}_{u,l}^{(s)} = z_{u,l}^{(s)} = [1 \ldots 1]^T$, and solving for:

$$\Delta \hat{f}_u = \frac{1}{2\pi T_{sym}} \arg\left\{\sum_{s=0}^{1} \sum_{l=-L_1}^{L_2-1} \left[(\hat{x}_{u,l}^{(s)})^H z_{u,l}^{(s)}\right]^H \left[(\hat{x}_{u,l+1}^{(s)})^H z_{u,l+1}^{(s)}\right]\right\}.$$

In another aspect, the plurality of receive antennas 104 accept a first multicarrier signal with either intra-subframe or inter-subframe hopping, where the first multicarrier signal has a frequency allocation of at least five times the channel coherence bandwidth. The coherence bandwidth is defined as the range of frequencies over which the channel can be considered "flat", or in other words the approximate maximum bandwidth or frequency interval over which two frequencies of a signal are likely to experience comparable or correlated amplitude fading. In this case, the CFO/Doppler estimation and correction module 118 associated with the first multicarrier signal may estimate the phase rotation of channel estimates as a function of time using the time-domain DM-RS estimation process, as follows:

letting $\hat{H}_{k,u}^{(s)}$ denote the $M_r \times 1$ channel estimate obtained from the DM-RS symbol for slot s (s=0,1), subcarrier k (k=0, ..., N−1) and user u, where $M_r$=number of receive antennas and N is the number of subcarriers allocated;

letting $N_{FFT}$ be an integer satisfying $N_{FFT} \geq N$;

letting $\hat{h}_{n,u}^{(s)}$ denote the $M_r \times 1$ time-domain channel estimate for slot s (s=0,1), index n (n=0, ..., N−1) and user u, where the time-domain channel estimate is obtained by taking the $N_{FFT}$-point inverse discrete Fourier transform of $\hat{H}_{k,u}^{(s)}$;

letting $N_{dom}$ denote the set of indices of the dominant channel taps; and, finding the combined CFO and Doppler frequency estimate for user u is given by:

$$\Delta \hat{f}_u = \frac{1}{2\pi T_{slot}} \arg \left[ \sum_{n \in N_{dom}} (\hat{h}_{n,u}^{(0)})^H \hat{h}_{n,u}^{(1)} \right].$$

In one aspect, the plurality of receive antennas 104 accept first multicarrier signals with inter-subframe frequency hopping, and a CFO/Doppler estimation and correction module 118 associated with the first multicarrier signal estimates the phase rotation of channel estimates as a function of time using the frequency-domain DM-RS estimation process, as follows:

letting $\hat{H}_{k,u}^{(s)}$ denote the $M_r \times 1$ channel estimate obtained from the DM-RS symbol for slot s (s=0,1), subcarrier k (k=0, ..., N−1) and user u, where $M_r$=number of receive antennas and N is the number of subcarriers allocated;

computing the combined CFO and Doppler frequency estimate for user u given by:

$$\Delta \hat{f}_u = \frac{1}{2\pi T_{slot}} \arg \left[ \sum_{k=0}^{N-1} (\hat{H}_{k,u}^{(0)})^H \hat{H}_{k,u}^{(1)} \right].$$

In another aspect, the plurality of receive antennas 104 accept a first multicarrier signal from a first user, and the CFO/Doppler estimation and correction module 118 associated with the first multicarrier signal may estimate the phase rotation of channel estimates as a function of time using the Fourier kernel estimation process. This technique is useful for allocation without Spatial-Division Medium Access (SDMA) or uplink MU-MIMO, and the solution uses only received reference signal symbols. The Fourier kernel estimation process is as follows:

letting N denote the number of subcarriers allocated to a user;

using only received reference signal symbols, defining:

$r_m^{(s)}$ the received signal from antenna m in slot s on allocated tones

F Fourier kernel on allocated tones $G(\Delta f)$ diagonal matrix whose diagonal elements are $e^{j2\pi \Delta f k}$ (k=0, 1, ... N−1)

$X^{(s)}$ Transmitted pilot in slot s $\hat{h}_m^{(s)}$ Given $\Delta f$, estimated frequency domain channel response of slot s on antenna m using a grid search, minimizing the metric of:

$$\operatorname{argmin}_{\Delta f} \sum_{s,m} \left\| r_m^{(s)} - F^H G(\Delta f) F X \hat{h}_m^{(s)} \right\|^2.$$

In one aspect, a first CFO/Doppler estimation and correction module (e.g., module 118-0), subsequent to supplying the CFO/Doppler frequency offsets, supplies corrected equalized symbols by phase rotating the equalized symbols as a function of the CFO/Doppler frequency estimates, slot index, and symbol index as follows:

letting $T_{sym}$ denote the duration of each multicarrier signal symbol;

letting $z_{u,l}^{(s)}$ denote a N×1 vector of received equalized symbols (slicer inputs) for user u, symbol l (l=−$L_1$, ..., $L_2$) and slot s (s=0,1); and, finding:

$$\tilde{z}_{u,l}^{(s)} = e^{-j2\pi \Delta \hat{f}_u T_{sym} l} z_{u,l}^{(s)}; l=-L_1, \ldots, L_2; s=0,1$$

In a related aspect, a second CFO/Doppler estimation and correction module (e.g., 118-(U−1)) accepts the corrected equalized symbols from the first CFO/Doppler estimation on line 124, estimates the frequency offset between the transmit carrier frequency of the first multicarrier signal and the receiver local oscillator, and supplies updated CFO/Doppler frequency estimates. Then, the second CFO/Doppler estimation and correction module 118-(U−1) supplies updated corrected equalized symbols by phase rotating the corrected equalized symbols as a function of the updated CFO/Doppler frequency estimates, slot index, and symbol index. Although only a single signal path is shown supplying corrected equalized symbols, any number of CFO/Doppler estimation and correction modules may be cross-connected to provide such a function.

Figure 8:
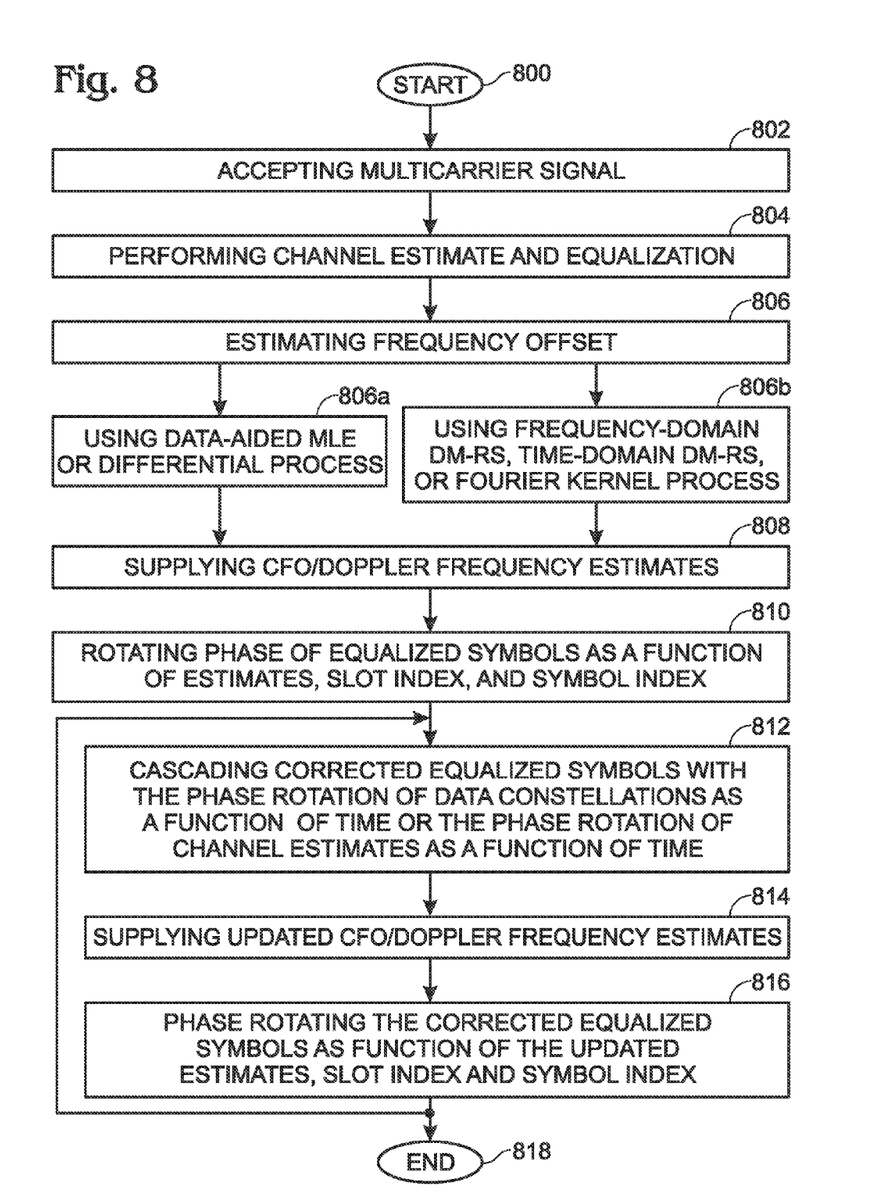
FIG. 8 is a flowchart illustrating a method for CFO and Doppler frequency estimation and correction for OFDMA and SC-FDMA signals in a wireless communications receiver.

FIG. 8 is a flowchart illustrating a method for CFO and Doppler frequency estimation and correction for OFDMA and SC-FDMA signals in a wireless communications receiver. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Typically however, the steps are performed in numerical order. The method starts at Step 800.

In Step 802 a receiver is provided capable of accepting a plurality of multicarrier signals transmitted simultaneously from a plurality of transmitters, with overlapping carrier frequencies and orthogonal reference signals. For each multicarrier signal, Step 804 performs a channel estimate and equalizes the channel. Step 806 estimates frequency offset between the transmit carrier frequency of each multicarrier signal and a receiver local oscillator frequency using either the phase rotation of data constellations as a function of time or the phase rotation of channel estimates as a function of time. Step 808 supplies CFO/Doppler frequency estimates.

In one aspect, estimating using the phase rotation of data constellations as a function of time includes estimating using the data-aided MLE and differential estimation process, as represented in Step 806a. Alternately in Step 806b, the phase rotation of channel estimates as a function of time includes uses the frequency-domain DM-RS, time-domain DM-RS, or Fourier kernel estimation process.

In one aspect, Step 802 accepts multicarrier signals with either intra-subframe or inter-subframe frequency hopping, and Step 806a estimates using the data-aided MLE estimation process. Explicit details for estimating using the data-aided MLE process have been provided above and are not repeated here in the interests of brevity. Likewise, explicit details for using the differential estimation process of Step 806a have been provided above.

In a different aspect, Step 802 accepts multicarrier signals with either inter-frame or intra-subframe frequency hopping, where each multicarrier signal has a frequency allocation of at least five times the channel coherence bandwidth. Then, Step 806b uses the time-domain DM-RS estimation process, which has been explained in detail above.

If Step 802 accepts multicarrier signals with inter-subframe frequency hopping, then Step 806b may use the frequency-domain DM-RS estimation process, which is explained in detail above.

If Step 802 accepts multicarrier signals from a single user, Step 806b may estimate the phase rotation of channel estimates as a function of time using the Fourier kernel estimation process, as described in detail above.

Subsequent to supplying the CFO/Doppler frequency estimates in Step 808, Step 810 phase rotates the equalized symbols as a function of the CFO/Doppler frequency estimates, slot index, and symbol index as follows:

letting $T_{sym}$ denote the duration of each multicarrier signal symbol;

letting $z_{u,l}^{(s)}$ denote a N×1 vector of received equalized symbols (slicer inputs) for user u, symbol l (l=−$L_1$, . . . , $L_2$) and slot s (s=0,1); and, finding:

$$\tilde{z}_{u,l}^{(s)}=e^{-j2\pi l\Delta \hat{f}_u T_{sym}}z_{u,l}^{(s)} l=-L_1,\ldots,L_2; s=0,1$$

Step 812 cascades the corrected equalized symbols with either the phase rotation of data constellations as a function of time or the phase rotation of channel estimates as a function of time. For example, an initial estimate can be obtained using frequency-domain DM-RS, with the differential technique applied to the corrected equalized symbols to create an updated estimate. Alternately, the data-aided MLE method can be used, with the correction for each iteration applied to a soft interference cancellation (SIC) receiver to obtain updated estimates for each SIC iteration.

Step 814 supplies updated CFO/Doppler frequency estimates. Step 816 phase rotates the corrected equalized symbols as a function of the updated CFO/Doppler frequency estimates, slot index, and symbol index, and Step 818 supplies updated corrected equalized symbols. Note, Steps 812 through 816 can be iterated any number of times. The method stops at Step 818, but it should be noted that a typical receiver would perform demodulation and decoding operations following Step 816.

A system and method have been provided for CFO/Doppler frequency estimation. Particular mathematical algorithms have been presented as examples to illustrate the invention, but the invention is not necessarily limited to these examples. Other variations and embodiments of the invention will occur to those skilled in the art.

We claim:

1. A method for carrier frequency offset (CFO) and Doppler frequency estimation and correction for Orthogonal Frequency-Division Multiple Access (OFDMA) and Single Carrier-Frequency-Division Multiple Access (SC-FDMA) signals, comprising:

accepting, at a receiver, a plurality of multicarrier signals transmitted simultaneously from a plurality of transmitters, the plurality of multicarrier signals having overlapping carrier frequencies, orthogonal reference signals, and one of intra-subframe hopping or inter-subframe hopping;

for each of the plurality of multicarrier signals, performing a channel estimate and equalizing a channel;

estimating frequency offset between a transmit carrier frequency of each of the plurality of multicarrier signals and a receiver local oscillator frequency using one of phase rotation of data constellations as a function of time or phase rotation of channel estimates as a function of time, wherein:

the estimating the frequency offset using the phase rotation of data constellations as a function of time comprises using a data-aided maximum-likelihood estimation (MLE) if the plurality of multicarrier signals have intra-subframe hopping or inter-subframe hopping, and the estimating the frequency offset using the phase rotation of channel estimates as a function of time comprises using a time-domain demodulation reference signal (DM-RS) if the plurality of multicarrier signals have inter-frame hopping or intra-subframe hopping; and determining a combined CFO and Doppler frequency estimate.

2. The method of claim 1, wherein the estimating the frequency offset using the phase rotation of data constellations as a function of time comprises estimating using a differential estimation.

3. The method of claim 2, wherein the estimating the frequency offset using the phase rotation of data constellations as a function of time comprises using the differential estimation comprises:

letting N denote a number of subcarriers allocated to a user;

letting $z_{u,l}^{(s)}$ denote a N×1 vector of received equalized symbols for user u, symbol l, and slot s for l=−L1, . . . , L2 and s=0,1;

letting $\hat{x}_{u,l}^{(s)}$ denote a N×1 vector of slicer outputs for user u, symbol l and slot s, assuming hard decisions are perfect; and for l=0 and s=0,1, $\hat{x}_{u,l}^{(s)}=z_{u,l}^{(s)}=[1 \ldots 1]^T$, and solving for:

$$\Delta \hat{f}_u = \frac{1}{2\pi T_{sym}} \arg\left\{ \sum_{s=0}^{1} \sum_{l=-L_1}^{L_2-1} \left[(\hat{x}_{u,l}^{(s)})^H z_{u,l}^{(s)}\right]^H \left[(\hat{x}_{u,l+1}^{(s)})^H z_{u,l+1}^{(s)}\right] \right\}.$$

4. The method of claim 1, wherein the estimating the frequency offset using the phase rotation of channel estimates as a function of time comprises using one of frequency-domain demodulation reference signal (DM-RS) or Fourier kernel estimation.

5. The method of claim 4, wherein the accepting the plurality of multicarrier signals comprises accepting multicarrier signals with inter-subframe frequency hopping; and wherein the estimating the frequency offset using the phase rotation of channel estimates as a function of time includes using the frequency-domain DM-RS estimation.

6. The method of claim 5, wherein using the frequency-domain DM-RS estimation comprises:

letting $\hat{H}_{k,u}^{(s)}$ denote a $M_r \times 1$ channel estimate obtained from a DM-RS symbol for slot s, subcarrier k, and user u for s=0,1 and k=0, ..., N−1, where $M_r$=a number of receive antennas and N is a number of subcarriers allocated;

computing the combined CFO and Doppler frequency estimate for user u given by:

$$\Delta \hat{f}_u = \frac{1}{2\pi T_{slot}} \arg\left[\sum_{k=0}^{N-1} (\hat{H}_{k,u}^{(0)})^H \hat{H}_{k,u}^{(1)}\right].$$

7. The method of claim 4, wherein the accepting the plurality of multicarrier signals comprises accepting multicarrier signals from a single user; and wherein estimating the frequency offset using the phase rotation of channel estimates as a function of time includes using the Fourier kernel estimation as follows:

letting N denote a number of subcarriers allocated to a user;

using only received reference signal symbols, defining:

$r_m^{(s)}$ the received signal from antenna m in slot s on allocated tones

F Fourier kernel on allocated tones $G(\Delta f)$ diagonal matrix whose diagonal elements are $e^{j2\pi\Delta f k}$ (k=0, 1, ... N−1)

$X^{(s)}$ Transmitted pilot in slot s $\hat{h}_m^{(s)}$ Given $\Delta f$, estimated frequency domain channel response of slot s on antenna m using a grid search, minimizing the metric of:

$$\operatorname{argmin}_{\Delta f} \sum_{s,m} \left\| r_m^{(s)} - F^H G(\Delta f) F X \hat{h}_m^{(s)} \right\|^2.$$

8. The method of claim 1, wherein using the data-aided MLE comprises:

letting N denote a number of subcarriers allocated to a user, where N is an integer;

letting $z_{u,l}^{(s)}$ denote a $N \times 1$ vector of received equalized symbols for user u, symbol l, and slot s for l=−L1 ..., L2 and s=0,1;

letting $\hat{x}_{u,l}^{(s)}$ denote a $N \times 1$ vector of slicer outputs for user u, symbol l, and slot s, assuming hard decisions are perfect;

for l=0 and s=0,1, $\hat{x}_{u,l}^{(s)} = z_{u,l}^{(s)} = [1 \ldots 1]^T$, finding the MLE for $\Delta f_u$ as follows:

$$\Delta \hat{f}_u = \frac{1}{2\pi T_{sym}} \operatorname{argmin}_{\Delta f_u} \sum_{s=0}^{1} \sum_{l=-L_1}^{L_2} \| z_{u,l}^{(s)} - e^{j2\pi l \Delta f_u T_{sys}} \hat{x}_{u,l}^{(s)} \|^2$$

using a small angle approximation, such that $|2\pi\max(L_1,L_2)\Delta f_u T_{sym}| \ll 1$; and solving for $$\Delta \hat{f}_u = \frac{1}{2\pi T_{sym}} \frac{\sum_{s=0}^{1} \sum_{l=-L_1}^{L_2} l \operatorname{Im}\left[(\hat{x}_{u,l}^{(s)})^H z_{u,l}^{(s)}\right]}{\sum_{s=0}^{1} \sum_{l=-L_1}^{L_2} l^2 \operatorname{Re}\left[(\hat{x}_{u,l}^{(s)})^H z_{u,l}^{(s)}\right]}.$$

9. The method of claim 1, wherein the estimating the frequency offset using the time-domain DM-RS estimation comprises using the time-domain DM-RS estimation if the plurality of multicarrier signals has a frequency allocation of at least five times a channel coherence bandwidth.

10. The method of claim 9, wherein using the time-domain DM-RS estimation comprises:

letting $\hat{H}_{k,u}^{(s)}$ denote a $M_r \times 1$ channel estimate obtained from a DM-RS symbol for slot s, subcarrier k, and user u for s=0,1 and k=0, ..., N−1, where $M_r$=a number of receive antennas; and N is a number of subcarriers allocated;

letting $N_{FFT}$ be an integer satisfying $N_{FFT} \geq N$;

letting $\hat{h}_{n,u}^{(s)}$ denote a $M_r \times 1$ time-domain channel estimate for slot s, index n for n=0, ..., N−1, and user u, where the time-domain channel estimate is obtained by taking a $N_{FFT}$-point inverse discrete Fourier transform of $\hat{H}_{k,u}^{(s)}$;

letting $N_{dom}$ denote a set of indices of dominant channel taps; and finding the combined CFO and Doppler frequency estimate for user u given by:

$$\Delta \hat{f}_u = \frac{1}{2\pi T_{slot}} \arg\left[\sum_{n \in N_{dom}} (\hat{h}_{n,u}^{(0)})^H \hat{h}_{n,u}^{(1)}\right].$$

11. The method of claim 1 further comprising:

subsequent to supplying the combined CFO and Doppler frequency estimate, phase rotating the equalized symbols as a function of the combined CFO and Doppler frequency estimates, slot index, and symbol index as follows:

letting $T_{sym}$ denote a duration of each symbol of the plurality of multicarrier signals;

letting $z_{u,l}^{(s)}$ denote a $N \times 1$ vector of received equalized symbols for user u, symbol l and slot s for l=−L_1, ..., L_2 and s=0,1; and finding:

$\tilde{z}_{u,l}^{(s)} = e^{-j2\pi l \Delta \hat{f}_u T_{sym}} z_{u,l}^{(s)}$; l=−L_1, ..., L_2; s=0,1.

12. The method of claim 11, further comprising:

cascading corrected equalized symbols with a frequency offset estimation process comprising one of the phase rotation of data constellations as a function of time or the phase rotation of channel estimates as a function of time;

supplying an updated combined CFO and Doppler frequency estimate;

phase rotating the corrected equalized symbols as a function of the updated combined CFO and Doppler frequency estimate, slot index, and symbol index; and determining updated corrected equalized symbols.

13. A system for carrier frequency offset (CFO) and Doppler frequency estimation and correction for Orthogonal Frequency-Division Multiple Access (OFDMA) and Single Carrier-Frequency-Division Multiple Access (SC-FDMA) signals, comprising:
- a plurality of receive antennas configured for accepting a plurality of multicarrier signals transmitted simultaneously from a plurality of transmitters, the plurality of multicarrier signals having overlapping carrier frequencies and orthogonal reference signals;
- a local oscillator configured to supply a down-conversion frequency;
- a channel estimator module having a plurality of inputs configured to accept the plurality of multicarrier signals and an output configured to supply respective channel estimates for the plurality of multicarrier signals;
- an equalizer having an input configured to accept the channel estimates and a plurality of outputs configured to supply a plurality of equalized symbols;
- a plurality of CFO/Doppler estimation and correction modules configured to accept a plurality of equalized channel estimates, each of the plurality of CFO/Doppler estimation and correction modules having an output configured to supply combined CFO and Doppler frequency estimates for a frequency offset between a transmit carrier frequency of a corresponding multicarrier signal and a receiver local oscillator frequency using one of a phase rotation of data constellations as a function of time or a phase rotation of channel estimates as a function of time, wherein the phase rotation of data constellations as a function of time comprises a data-aided maximum-likelihood estimation (MLE) if the plurality of multicarrier signals have intra-subframe hopping or inter-subframe hopping, and wherein the phase rotation of channel estimates as a function of time comprises a time-domain demodulation reference signal (DM-RS) if the plurality of multicarrier signals have inter-frame hopping or intra-subframe hopping.

14. The system of claim 13, wherein each of the plurality of CFO/Doppler estimation and correction module estimates the phase rotation of data constellations as a function of time using a differential estimation.

15. The system of claim 14, wherein a first CFO/Doppler estimation and correction module estimates the phase rotation of data constellations as a function of time comprises using the differential estimation as follows:
- letting N denote a number of subcarriers allocated to a user;
- letting $z_{u,l}^{(s)}$ denote a N×1 vector of received equalized symbols for user u, symbol l and slot s for $l=-L_1, \ldots, L_2$ and $s=0,1$;
- letting $\hat{x}_{u,l}^{(s)}$ denote a N×1 vector of slicer outputs for user u, symbol l and slot s, assuming hard decisions are perfect; and
- for l=0 and s=0,1, $\hat{x}_{u,l}^{(s)}=z_{u,l}^{(s)}=[1 \ldots 1]^T$, and solving for:

$$\Delta \hat{f}_u = \frac{1}{2\pi T_{sym}} \arg\left\{\sum_{s=0}^{1} \sum_{l=-L_1}^{L_2-1} [(\hat{x}_{u,l}^{(s)})^H z_{u,l}^{(s)}]^H [(\hat{x}_{u,l+1}^{(s)})^H z_{u,l+1}^{(s)}]\right\}.$$

16. The system of claim 13, wherein each of the plurality of CFO/Doppler estimation and correction module estimates using the phase rotation of channel estimates as a function of time uses one of frequency-domain demodulation reference signal (DM-RS) or Fourier kernel estimation.

17. The system of claim 16, wherein the plurality of receive antennas accept a first multicarrier signal with inter-subframe frequency hopping; and wherein a first CFO/Doppler estimation and correction module associated with the first multicarrier signal estimates the phase rotation of channel estimates as a function of time using the frequency-domain DM-RS estimation as follows:
- letting $\hat{H}_{k,u}^{(s)}$ denote a $M_r\times 1$ channel estimate obtained from the DM-RS symbol for slot s, subcarrier k and user u for s=0,1 and k=0, ..., N−1, where $M_r$=a number of receive antennas and N is a number of subcarriers allocated; and
- computing a combined CFO and Doppler frequency estimate for user u given by:

$$\Delta \hat{f}_u = \frac{1}{2\pi T_{slot}} \arg\left[\sum_{k=0}^{N-1} (\hat{H}_{k,u}^{(0)})^H \hat{H}_{k,u}^{(1)}\right].$$

18. The system of claim 16, wherein the plurality of receive antennas accept a first multicarrier signal from a first user; and
wherein a first CFO/Doppler estimation and correction module associated with the first multicarrier signal estimates the phase rotation of channel estimates as a function of time using the Fourier kernel estimation as follows:
- letting N denote a number of subcarriers allocated to a user;
- using only received reference signal symbols, defining:
- $r_m^{(s)}$ the received signal from antenna m in slot s on allocated tones
- F Fourier kernel on allocated tones
- $G(\Delta f)$ diagonal matrix whose diagonal elements are $e^{j2\pi\Delta f k}$ (k=0, 1, ... N−1)
- $X^{(s)}$ Transmitted pilot in slot s
- $\hat{h}_m^{(s)}$ Given $\Delta f$, estimated frequency domain channel response of slot s on antenna m
- using a grid search, minimizing the metric of:

$$\operatorname{argmin}_{\Delta f} \sum_{s,m} \left\| r_m^{(s)} - F^H G(\Delta f) F X \hat{h}_m^{(s)} \right\|^2.$$

19. The system of claim 13,
wherein a first CFO/Doppler estimation and correction module associated with a first multicarrier signal estimates the phase rotation of data constellations as a function of time using the data-aided MLE as follows:
- letting N denote a number of subcarriers allocated to a user;
- letting $z_{u,l}^{(s)}$ denote a N×1 vector of received equalized symbols for user u, symbol l and slot s for $l=-L_1, \ldots, L_2$ and s=0,1;
- letting $\hat{x}_{u,l}^{(s)}$ denote a N×1 vector of slicer outputs for user u, symbol l and slot s, assuming hard decisions are perfect;
- for l=0 and s=0,1, $\hat{x}_{u,l}^{(s)}=z_{u,l}^{(s)}=[1 \ldots 1]^T$, finding an MLE for $\Delta f_u$ as follows:

$$\Delta \hat{f}_u = \frac{1}{2\pi T_{sym}} \operatorname{argmin}_{\Delta f_u} \sum_{s=0}^{1} \sum_{l=-L_1}^{L_2} \| z_{u,l}^{(s)} - e^{j2\pi l \Delta f_u T_{sys}} \hat{x}_{u,l}^{(s)} \|^2$$

using a small angle approximation, such that $|2\pi \max(L_1,L_2) \Delta f_u T_{sym}| \ll 1$; and solving for $$\Delta \hat{f}_u = \frac{1}{2\pi T_{sym}} \frac{\sum_{s=0}^{1} \sum_{l=-L_1}^{L_2} l \operatorname{Im}[(\hat{x}_{u,l}^{(s)})^H z_{u,l}^{(s)}]}{\sum_{s=0}^{1} \sum_{l=-L_1}^{L_2} l^2 \operatorname{Re}[(\hat{x}_{u,l}^{(s)})^H z_{u,l}^{(s)}]}.$$

20. The system of claim 13, wherein the plurality of receive antennas accept a first multicarrier signal with frequency hopping comprising one of intra-subframe hopping or inter-subframe hopping, wherein the first multicarrier signal has a frequency allocation of at least five times a channel coherence bandwidth; and
  wherein a first CFO/Doppler estimation and correction module associated with the first multicarrier signal estimates the phase rotation of channel estimates as a function of time using the time-domain DM-RS estimation as follows:
  letting $\hat{H}_{k,u}^{(s)}$ denote Mr×1 channel estimate obtained from the DM-RS symbol for slot s, subcarrier k, and user u for s=0,1 and k=0, ..., N−1, where Mr=a number of receive antennas and N is a number of subcarriers allocated;
  letting $N_{FFT}$ be an integer satisfying $N_{FFT} \geq N$;
  letting $\hat{h}_{n,u}^{(s)}$ denote a Mr×1 time-domain channel estimate for slot s, index n and user u for s=0,1 and n=0, ..., N−1, where the time-domain channel estimate is obtained by taking a $N_{FFT}$-point inverse discrete Fourier transform of $\hat{H}_{k,u}^{(s)}$;
  letting $N_{dom}$ denote a set of indices of dominant channel taps; and
  finding a combined CFO and Doppler frequency estimate for user u given by:

$$\Delta \hat{f}_u = \frac{1}{2\pi T_{slot}} \arg\left[\sum_{n \in N_{dom}} (\hat{h}_{n,u}^{(0)})^H \hat{h}_{n,u}^{(1)}\right].$$

21. The system of claim 13, wherein a first CFO/Doppler estimation and correction module, subsequent to supplying the combined CFO and Doppler frequency estimates, supplies corrected equalized symbols by phase rotating the plurality of equalized symbols as a function of the combined CFO and Doppler frequency estimates, slot index, and symbol index as follows:
  letting $T_{sym}$ denote a duration of each multicarrier signal symbol;
  letting $z_{u,l}^{(s)}$ denote a N×1 vector of received equalized symbols for user u, symbol l and slot s for l=−L1, ..., L2 and s=0,1; and
  finding:

$$\tilde{z}_{u,l}^{(s)} = e^{-j2\pi l \Delta \hat{f}_u T_{sym}} z_{u,l}^{(s)}; -L_1, \ldots, L_2; s=0,1.$$

22. The system of claim 21, wherein a second CFO/Doppler estimation and correction module accepts the corrected equalized symbols from the first CFO/Doppler estimation and correction module, estimates a frequency offset between a transmit carrier frequency of the first multicarrier signal and the receiver local oscillator, and supplies updated combined CFO and Doppler frequency estimates; and
  wherein the second CFO/Doppler estimation and correction module supplies updated corrected equalized symbols by phase rotating the corrected equalized symbols as a function of the updated combined CFO and Doppler frequency estimates, the slot index, and the symbol index.

* * * * *